US012711267B2

(12) United States Patent
Chawla et al.

(10) Patent No.: US 12,711,267 B2
(45) Date of Patent: Aug. 18, 2026

(54) ROLE-BASED REDACTION OF CONTENT

(71) Applicant: Omnissa, LLC, Mountain View, CA (US)

(72) Inventors: Ravish Chawla, Chamblee, GA (US); Rohit Pradeep Shetty, Bangalore (IN); Adam Chow, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 265 days.

(21) Appl. No.: 18/315,759

(22) Filed: May 11, 2023

(65) Prior Publication Data

US 2024/0378314 A1 Nov. 14, 2024

(51) Int. Cl.
*G06F 21/62* (2013.01)
*H04L 9/40* (2022.01)

(52) U.S. Cl.
CPC ........ *G06F 21/6245* (2013.01); *H04L 63/102* (2013.01); *H04L 63/105* (2013.01)

(58) Field of Classification Search
CPC .. G06F 21/6245; H04L 63/102; H04L 63/105
USPC .............................................................. 726/1
See application file for complete search history.

(56) References Cited

U.S. PATENT DOCUMENTS

2011/0119576 A1* 5/2011 Aumann ............. G06F 16/1744 715/255
2014/0047556 A1* 2/2014 Davis .................. G06F 21/6209 726/28
2015/0186635 A1* 7/2015 Nakhjiri .................. H04L 69/22 726/17
2017/0132186 A1* 5/2017 Plummer ............ G06F 21/6227
2017/0220813 A1* 8/2017 Mullins .................. G06F 16/93
2017/0337352 A1* 11/2017 Williams ................ G06F 21/32
2019/0356672 A1* 11/2019 Bondugula ........... H04L 63/205
2022/0245175 A1* 8/2022 Hawco .................. G06F 16/906

* cited by examiner

*Primary Examiner* — Jacob Lipman
(74) *Attorney, Agent, or Firm* — Kim & Stewart LLP

(57) ABSTRACT

Disclosed are various embodiments for redacting or modifying content in documents that are provided to users. A user's clearance level can be determined by analyzing the role of the user within the enterprise. A redaction level can be determined from the clearance level. A document or other content can be modified or redacted based upon the redaction level.

17 Claims, 5 Drawing Sheets

135

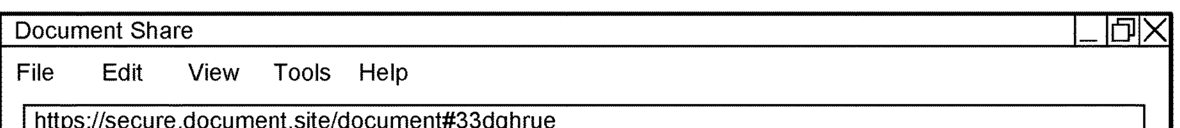

Personnel
Summary

Name: Jane Foe
Address: 123 Main St
Atlanta, GA 30303

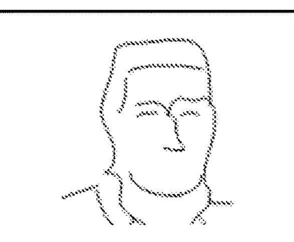

Compensation: $100,000
SS: 233-22-2232
Employee ID: 61A-34D4

Personnel History:
Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Figure 3:
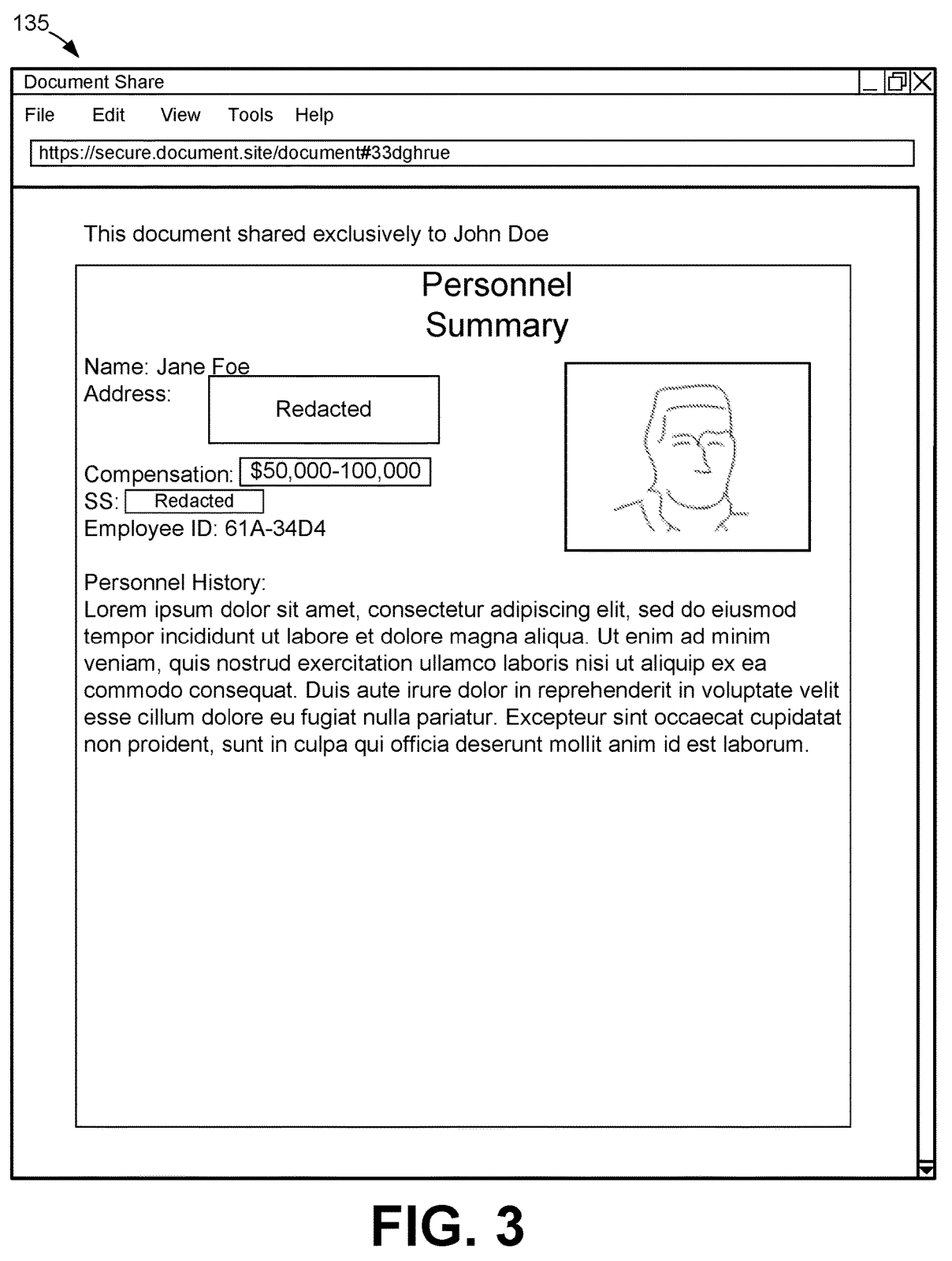

Document Share

File Edit View Tools Help https://secure.document.site/document#33dghrue

This document shared exclusively to John Doe

Personnel
Summary

Name: Jane Foe
Address: Redacted

Compensation: $50,000-100,000
SS: Redacted
Employee ID: 61A-34D4

Personnel History:
Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

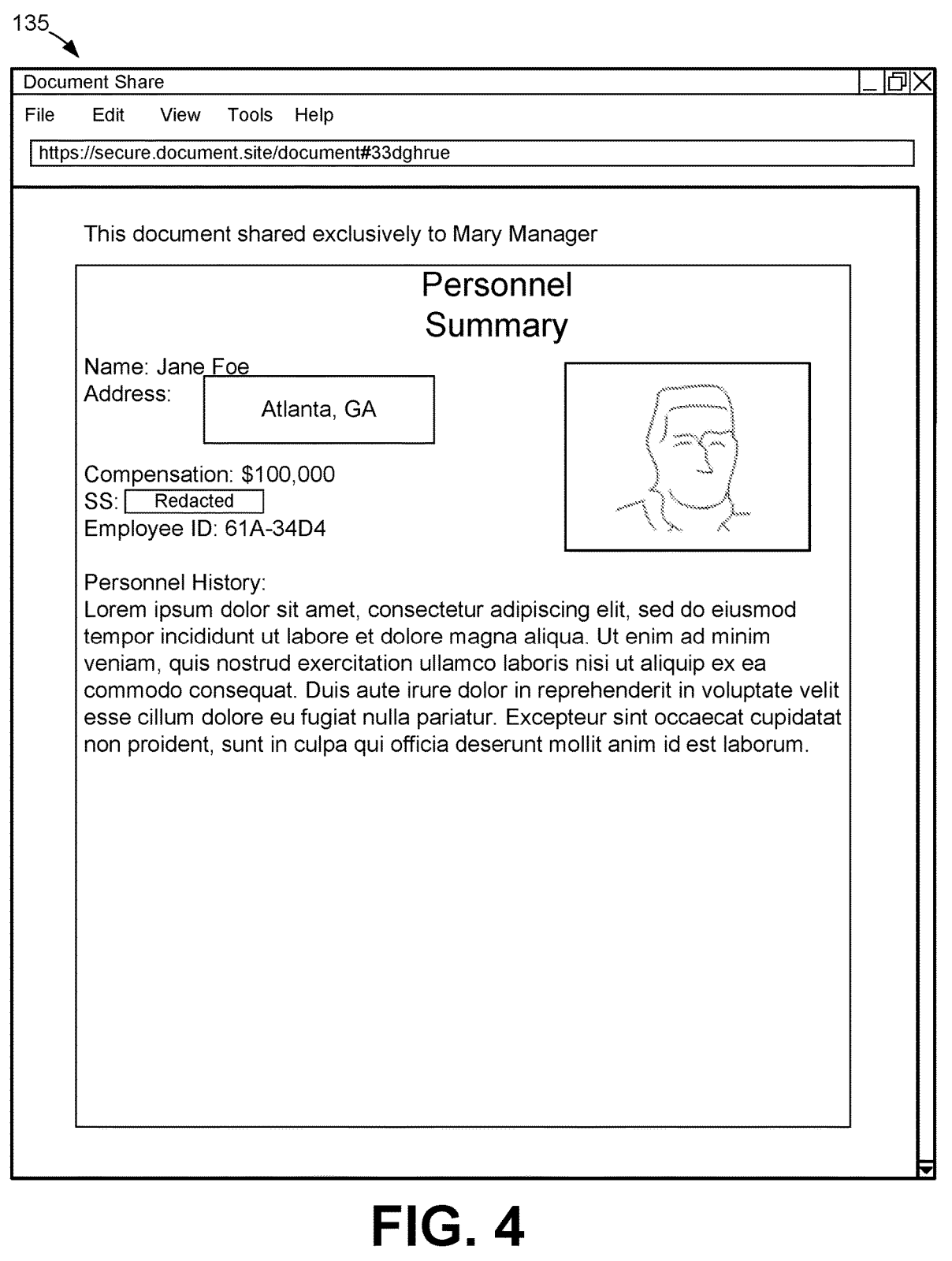

Document Share

File Edit View Tools Help https://secure.document.site/document#33dghrue

This document shared exclusively to Mary Manager

Personnel Summary

Name: Jane Foe

Address: Atlanta, GA

Compensation: $100,000

SS: Redacted

Employee ID: 61A-34D4

Personnel History:

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

FIG. 4

ROLE-BASED REDACTION OF CONTENT

BACKGROUND

Users within an enterprise may have access to certain documents or other content. Users might wish to share or publish documents with other users within the enterprise or outside of the enterprise. Typical document sharing can be facilitated by email or file transfer services or protocols. Different users within an enterprise might have different levels of access to confidential or personally identifiable information based upon their role or access credentials associated with the enterprise.

For example, a user at an executive level might have access to certain types of content within an enterprise, whereas another user at a subordinate level might not have access to certain types of content within the enterprise. Accordingly, sharing a document or another type of content to these users can be made difficult because a document might contain content that the executive user is entitled to view but that the subordinate user is not entitled to view.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-4 are example user interfaces generated by a browser based upon a document representation of a document according to various embodiments of the present disclosure.

DETAILED DESCRIPTION

Users in an enterprise environment can be provided with access to documents via a mobile device, computer and/or other type of computing device or client device. Users may also wish to share documents with other users who are internal or external to the enterprise. Examples of the disclosure can facilitate redaction or modification of content of a document depending upon the credentials or role of a viewer of the document. For example, a document can contain confidential or personal identifiable information (PII). Depending upon the identity of the viewer of the content, certain information in the document can be redacted. For example, a user within an enterprise with the authority to view PII can be provided an unredacted document. However, other users within the enterprise that do not have the authority to view PII can be provided with a redacted version of the document. Additionally, another user might have the authority to view certain information in the document but not others, which can create another permutation of a document that is needed for this third class of user. In some cases, there can be even more classes of users, which can require even more versions of redacted content that might be distributed or available within an enterprise.

Manually generating redacted versions that are customized depending upon the clearance level of a user can be a time-consuming process. Accordingly, embodiments of the disclosure can operate by obtaining a document or other content and generating a redacted or modified version of the content for a user depending upon the types of content the user is authorized to view. Upon obtaining a document or content, examples of the disclosure can identify types of the content within the document and redact or generalize the content so that the details are not accessible but that the type of data can be ascertained from the content. In some cases, content can be redacted in whole or generalized depending upon the role or clearance level of a viewing user.

Figure 1:
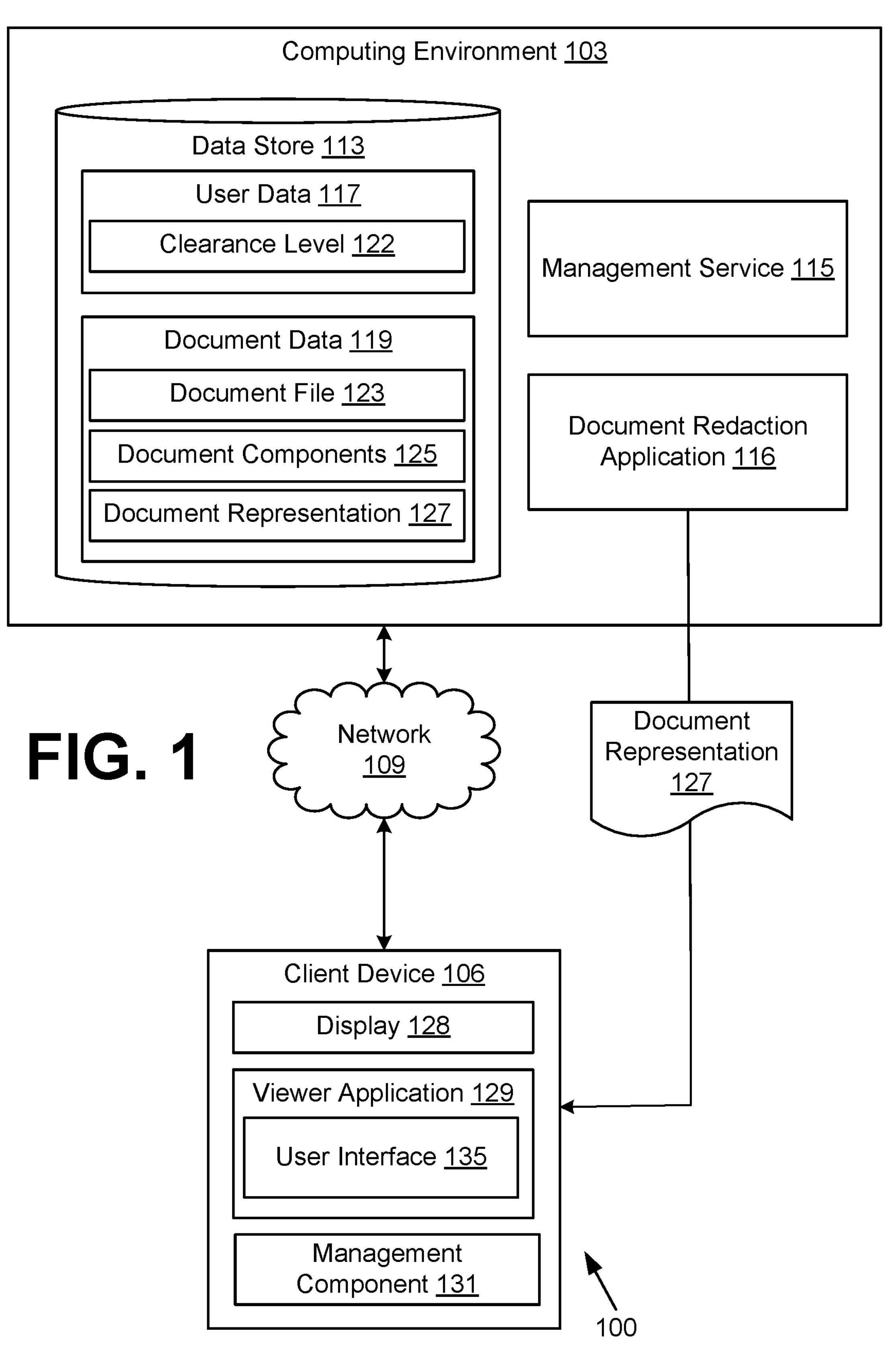
FIG. 1 is a drawing of a networked environment according to various embodiments of the present disclosure.

With reference to FIG. 1, shown is a networked environment 100 according to various embodiments. The networked environment 100 includes a computing environment 103 and a client device 106, and another client device 106, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ a plurality of computing devices that can be arranged, for example, in one or more server banks, computer banks or other arrangements. Such computing devices can be located in a single installation or can be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various systems and/or other functionality can be executed in the computing environment 103 according to various embodiments. Also, various data is stored in a data store 113 that is accessible to the computing environment 103. The data store 113 can be representative of a plurality of data stores 113 as can be appreciated. The data stored in the data store 113, for example, is associated with the operation of the various applications and/or functional entities described below.

The components executed on the computing environment 103, for example, include a management service 115, a document redaction application 116, and other applications, services, processes, systems, engines, or functionality not discussed in detail herein. The management service 115 can be executed to manage and/or oversee the operation of multiple client devices 106 that are enrolled within a device management framework facilitated by the management service 115. For example, an employer may operate the management service 115 to ensure that the client devices 106 of its employees are operating in compliance with various compliance rules. By ensuring that the client devices 106 of its employees are operated in compliance with the compliance rules, the employer may control and protect access to various data as well as the usage of devices that are potentially issued by the employer. The management service 115 may also facilitate access to email, calendar data, contact information, documents, or other enterprise data to which an enterprise may wish to provide access by users via client devices 106.

The computing environment 103 can also execute a document redaction application 116 that facilitates the sharing of documents between users within an enterprise as well as to users who are external to the enterprise. The document redaction application 116 can receive or identify a document that a user of the enterprise desires to share with another user and generate a document representation of the document. The document representation of the document can also be associated with a security restriction that restricts use of the content of the document in some form. As will be described herein, a security restriction associated with a document representation can take various forms, such as a restriction on the ability of a user to whom the document is shared to copy, print, disseminate or otherwise use the document in contravention of the security restrictions. In the context of this disclosure, a document may also be shared by a user in the sense that the user attempts to access a copy of a document that is stored within the computing environment 103 via a client device 106 using an application configured to facilitate access to a storage account of the user within the enterprise.

The data stored in the data store 113 includes, for example, user data 117, document data 119, and potentially other data. The user data 117 can include data associated with a user account, such as a clearance level 122, user documents, and other user profile information. User data 117 can include access settings, such as authentication credentials, delegation settings (e.g., information about other users who can be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multi-factor authentication settings, and other data related to a user account as can be appreciated.

User data 117 can further include a role within an organizational hierarchy. For example, a role can identify the user as a supervisor for certain other users and/or as reporting to another user in an organization. The clearance level 122 can specify one of a plurality of clearance levels. The clearance level 122 can specify a redaction level associated with confidential, sensitive, or PII information that is needed to provide the user with content containing such information. For example, the clearance level 122 can specify that personal information such as address, social security number, and other information should be redacted from a document for a particular viewer. The clearance level 122 can further specify that the information should be modified or generalized for the viewer. Redaction can mean that the information is removed, blocked, or totally obscured from the document. Content can also be modified or generalized by applying a generalization algorithm that generalizes the information so that the viewer can view certain aspects of the information without viewing all of the detailed information.

For example, a generalization algorithm can identify the content type for information in a document, such as PII, financial values, dates, geographic information, device information of a user, and other types of information that the algorithm can be trained on. The clearance level 122 can specify how much information identified by the generalization algorithm that the user is permitted to view and how much information should be modified or redacted. The clearance level 122 can specify that a user, given a particular title or level within an organization, which can be specified by the user data 117, can view unredacted information, view information with certain modification or redactions, and so forth.

In some embodiments and examples, user data 117 may also include compliance rules that are enforced by one or more applications executed by a client device 106 and/or the management service 115. In this sense, compliance rules can be stored on the data store 113 and/or on the client device 106 and represent requirements with which a user and/or a client device 106 must comply in order to access user data 117 via the computing environment 103 or access the network 109.

In one embodiment, compliance rules can specify one or more conditions that must be met in order for a particular user and/or client device 106 to access a copy of document file 119. A compliance rule can specify a condition with respect to a client device 106, a property of a request to share a particular document and/or a property of the document itself as well as an action that should be taken with respect to the condition.

For example, a compliance rule can specify that a client device 106, in order to access certain content, the client device 106 must execute a particular version of an operating system, a browser or any other application or the sensitive information identified in the document is redacted. As another example, a compliance rule may specify that in order to access certain content, a client device 106 must do so from within a particular geographic location and/or via a particular network without redaction or modification. A compliance rule can also specify certain time windows during a particular day, week, month or year during which a client device 106 is authorized to access content without redaction or modification.

Another example of a compliance rule may comprise a requirement that an operating system of the client device 106 be unmodified with respect to root access or superuser privileges available to the user. For example, certain mobile devices and/or mobile devices can be shipped with restrictions or limitations regarding root access or superuser privileges. In other words, such access can be unavailable to the user. However, certain users may employ exploits related to software and/or hardware of the client device 106 in order to gain root access or superuser privileges with respect to the client device 106. Accordingly, a compliance rule specified by a network administrator may require that such a restriction or limitation on root access or superuser privileges remain in place with respect to a client device 106 in order for the client device 106 to access content without redaction or modification.

A compliance rule can specify that the client device 106 and/or other employ a certain encryption protocol or procedure. For example, a compliance rule may specify that the client device 106 employ data at rest encryption for certain data stored on the client device 106. As another example, a compliance rule may specify that a client device 106 and/or an application executed by the client device should periodically communicate with or "ping" the management service 115 and/or another application or service within a specified amount of time relative to a previous communication or ping. In other words, the compliance rule can specify that the client device 106 periodically "check in" with the management service 115 or another server process.

Another compliance rule may specify that certain applications may not be installed on a client device 106 in order for the client device 106 to be permitted to access content without redaction or modification. For example, certain applications can be identified as malicious applications or unauthorized applications. Accordingly, if such an application is detected to be installed on the client device 106, a compliance rule may specify that such a client device 106 is not permitted to access content without redaction or modification. Alternatively, a compliance rule may also require that one or more applications be installed on the client device 106 in order for the client device 106 to be permitted to access a user document 121, a document representation 127 of the user document 121, user data 117 and/or the network 109. For example, certain applications can be identified as required applications by an administrator. Accordingly, if such an application is not detected to be installed on the client device 106, a compliance rule may specify that such a client device 106 is not permitted to access a user document 121, a document representation 127 of the user document 121, user data 117 and/or the network 109.

Additionally, certain compliance rules can be enforced depending upon the location of the client device 106. For example, certain compliance rules can be triggered when the location of the client device 106 is detected to be within or outside of a certain geographic area or when the client device 106 is connected to a particular network 109. In such a scenario, the management component 131, document redaction application 116 and/or management service 115 can remove access to or redact/modify content when a compliance rule is violated and when a particular property regarding the location of the client device 106 can be detected. A location property can be detected via a global positioning system or other location detection capability of the device and/or when the client device 106 is in a particular data roaming state.

Additionally, one or more compliance rule may specify an action that should be taken when a violation of a compliance rule is detected or another condition is detected. For example, if a particular client device 106 is located within or outside a particular geographic area or in a particular data roaming state, a compliance rule can specify that the client device 106 is not authorized access content or a document. Alternatively, if a particular client device 106 complies with the various compliance rules, the document redaction application 116 can allow the client device 106 to access a copy of a particular document according to the clearance level 122 of the user associated with the client device 106.

Compliance with compliance rules can be determined by a process executed by the client device 106, by the management service 115, the document redaction application 116, by a combination of the management service 115 and a locally executed process, or by another process that is executed on another computing device. For example, a document representation 127 of a document rendered by the client device 106 can include code executed by a browser that submits a request to the document redaction application 116 requesting that the document redaction application 116 determine whether the client device 106 is in compliance with compliance rules. Additionally, compliance can be determined by a combination of the management component 131 and/or the device management application 115 or document redaction application 116. For example, compliance with certain compliance rules can be determined locally on the client device 106, while others may require or can be more efficiently determined by the management service 115 and/or document redaction application 116.

The client device 106 is representative of a plurality of client devices that can be coupled to the network 109. The client device 106 can comprise, for example, a processor-based system such as a computer system. Such a computer system can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 can include a display 128 that comprises, for example, one or more devices such as liquid crystal display (LCD) displays, gas plasma-based flat panel displays, organic light emitting diode (OLED) displays, LCD projectors or other types of display devices.

The client device 106 can execute various applications, such as a viewer application 129, a management component 131, and/or other components. In this respect, the client device 106 represents a device executing a management component 131 and/or a device that is enrolled within a device management framework associated with an enterprise. A client device 106 represents a device associated with a user who can be external to the enterprise or a device that is not enrolled within the device management framework of the enterprise. The viewer application 129 can obtain and render a document representation 127 to generate user interfaces 135 based upon the document representation 127 transmitted from the document redaction application 116, the management service 115 and/or any other process or server. The viewer application 129 can include, for example, a browser, a special purpose application configured to facilitate the browsing of documents available via the data store 113, or any other type of application that can render a document representation 127. A user interface 135 can be rendered by the viewer application 129 from a document representation 127 that corresponds to a particular user document or content obtained from the document redaction application 116.

The management component 131 can be executed on the client device 106 to oversee, monitor, and/or manage at least a portion of the resources for the client device 106. The management component 131 can be executed by the client device 106 automatically upon startup of the client device 106. Additionally, the management component 131 may run as a background process in the client device 106. In other words, the management component 131 may execute and/or run without user intervention. Additionally, the management component 131 may communicate with the management service 115 to facilitate the management of the client device 106 by the management service 115.

Next, a general description of the operation of the various components of the networked environment 100 is provided. To begin, the document redaction application 116 can obtain a request from a user of an enterprise to obtain a document or content that the enterprise has determined should be analyzed by the document redaction application 116 to identify content that should be redacted or modified according to the clearance level 122 of the user associated with the request. Such a request can be initiated by a user interface, such as a web page, that is generated by the document redaction application 116 and presented to a user of the enterprise. The document redaction application 116 can perform an entity recognition analysis on the content to identify entities in the document.

For example, the document redaction application 116 can perform a name entity recognition analysis on the content, which can be a natural language processing analysis performed by a machine learning engine on the content. The analysis can identify proper nouns. By utilizing parts of speech tagging in a text-based dataset, the document redaction application 116 can be trained to learn different parts of speech as well.

The identified entities can then be analyzed by the document redaction application 116 utilizing a generalization algorithm. The identified entities can be generalized or redacted based upon the type of entity identified and the clearance level 122 associated with the user. The identified entities can include personally identifiable information, such as names, identification numbers, dates, addresses, and device information associated with a user. Additionally, financial values, such as compensation, property value, market value, etc., can also be identified in the content.

Then, the content can be modified or redacted based upon the type or category of the identified and based upon the clearance level 122. For example, the clearance level 122 can indicate that a given user is allowed unredacted information to all content in the document. In this scenario, the document redaction application 116 can perform no modification of the document before presenting the document representation 127 to the user. In another example, the document redaction application 116 can determine that the clearance level 122 of the user specifies that the user is entitled to view financial values in the requested content but only if they have been generalized and modified by the document redaction application 116.

In another example, the document redaction application 116 can determine that the clearance level 122 of the user specifies that the user is entitled to view dates in the requested content but only if they have been rounded to the nearest month, year, or decade based upon a scaling level. In another example, the document redaction application 116 can determine that the clearance level 122 of the user specifies that the user is entitled to view identification numbers but only if they are randomized or significant digits removed or redacted by the document redaction application 116 based upon a scaling level. In another example, the document redaction application 116 can determine that the clearance level 122 of the user specifies that the user is entitled to view addresses in the requested content but only if they have been generalized and modified by the document redaction application 116 by rounding to a next largest geographical area, such as city, state, country or continent based upon a scaling level.

In another example, the document redaction application 116 can determine that the clearance level 122 of the user specifies that the user is entitled to view device information in the requested content but only if it has been generalized and device serial number or other uniquely identifying information has been removed or modified by the document redaction application 116 based upon a scaling level. The scaling level utilized by the document redaction application 116 can be determined by the clearance level 122 of the user. For example, an entry-level user on a new project might not have the same level of clearance as supervisory or managerial user. The level of clearance can be defined by an administrator or by the user data 117, which can provide a conversion between a role within an organizational hierarchy and a clearance level 122.

Because of unique generalization methods can be utilized for each of the different content types that can be identified within a document, each content type can be associated with a unique algorithm for redaction or modification. The algorithms can return a variety of different responses for each scaling level, which can be used by the document redaction application 116 to select the correct scale based on the level needed. The algorithms are discussed in further detail after discussion of an example of the document redaction application 116 in operation as illustrated in FIGS. 2-4.

Referring next to FIG. 2, shown is an example user interface 135 that can be rendered by a viewer application 129 executed by a client device 106 according to various embodiments of the disclosure. The user interface 135 corresponds to a document representation 127 rendered by the viewer application 129 in response to obtaining a document or other content via the document redaction application 116. In one example, the document redaction application 116 can provide a redacted or modified version of content to an application that serves content via a web server, and the viewer application 129 can be a web browser that renders the user interface 135 in this instance. As shown in the example of FIG. 2, the document representation 127, when rendered by a viewer application 129, causes at least a portion of the content of a particular document to be displayed within the user interface 135. As also shown in FIG. 2, the document representation 127 can represent content that is unmodified or unredacted by the document redaction application 116. In this scenario, the viewing user for whom the content is rendered might have elevated privileges that permits the user to view unredacted content. Alternatively, the example of FIG. 2 can also illustrate a scenario where the document redaction application 116 is not utilized according to examples of the disclosure so that sensitive content in the document is not redacted or modified.

Continuing the example of FIG. 2, reference is now made to FIG. 3, which illustrates another example user interface 135 that can be rendered by a viewer application 129 executed by a client device 106 according to various embodiments of the disclosure. The user interface 135 shown in FIG. 3 also corresponds to the document representation 127 rendered by the viewer application 129 in response to the redaction or modification of the content requested by the user. The content can be redacted or modified by the document redaction application 116 according to a clearance level 122 and the content type detected within the document by the document redaction application 116. In the example of FIG. 3, the document redaction application 116 has determined that the user is not cleared to view address information according to the clearance level 122 and the scaling level indicated by the clearance level 122. In the example shown in FIG. 3, the clearance level 122 has indicated that the user is not permitted to view compensation information, or financial figures, unless the figures are presented in a range or rounded to the nearest $50,000. The scaling level can be indicated by the clearance level 122 to specify the degree of rounding for the financial information.

Additionally, the document redaction application 116 has redacted an ID number presented in the document. The document redaction application 116 can detect an ID number requiring redaction according to the format of the number as well as contextual information, such as characters immediately preceding or following the ID number. Accordingly, some ID numbers presented in the document might be permitted for viewing by the user if they are not overly sensitive, which is a rule that can be specified by the clearance level 122. Accordingly, in examples of the disclosure, the clearance level 122 can indicate a redaction level or a degree to which content should be modified or redacted given the role or permissions of a user within the enterprise.

Continuing the example of FIG. 3, reference is now made to FIG. 4, which illustrates another example user interface 135 that can be rendered by a viewer application 129 executed by a client device 106 according to various embodiments of the disclosure. The user interface 135 shown in FIG. 3 also corresponds to the document representation 127 rendered by the viewer application 129 in response to the redaction or modification of the content requested by the user. The content can be redacted or modified by the document redaction application 116 according to a clearance level 122 and the content type detected within the document by the document redaction application 116. In the example of FIG. 3, the document redaction application 116 has determined that the user is not cleared to view address information according to the clearance level 122 and the scaling level indicated by the clearance level 122. In the example shown in FIG. 3, the scaling level indicates that the address information should be generalized according to the nearest city so that the street address is redacted. Additionally, the clearance level 122 has indicated that the user is permitted to view compensation information, or financial figures.

Additionally, the document redaction application 116 has redacted an ID number presented in the document. The document redaction application 116 can detect an ID number requiring redaction according to the format of the number as well as contextual information, such as characters immediately preceding or following the ID number. Accordingly, some ID numbers presented in the document might be permitted for viewing by the user if they are not overly sensitive, which is a rule that can be specified by the clearance level 122. Accordingly, in examples of the disclosure, the clearance level 122 can indicate a redaction level or a degree to which content should be modified or redacted given the role or permissions of a user within the enterprise.

Figure 5:
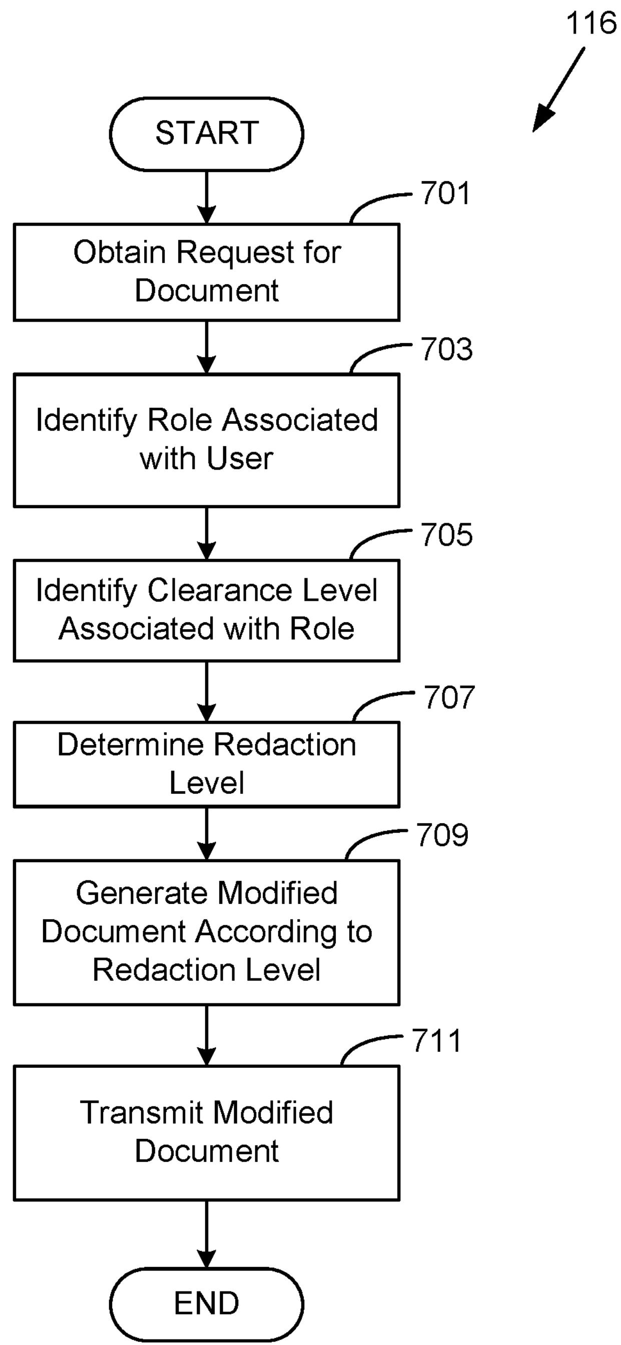
FIG. 5 is a flowchart illustrating one example of functionality implemented as portions of agent application executed in a computing environment in the networked environment of FIG. 1 according to various embodiments of the present disclosure.

Referring next to FIG. 5, shown is a flowchart that provides one example of the operation of a portion of the document redaction application 116 according to various embodiments. It is understood that the flowchart of FIG. 5 provides merely an example of the many different types of functional arrangements that can be employed to implement the operation of the portion of the document redaction application 116 as described herein. As an alternative, the flowchart of FIG. 5 can be viewed as depicting an example of elements of a method implemented in the computing environment 103 (FIG. 1) according to one or more embodiments.

Beginning with box 701, the document redaction application 116 obtains a request for a document on behalf of a user of the enterprise. In some embodiments, the user may not be associated with an enterprise or an organization but may rather be viewing a document or content through a portal in which the document redaction application 116 determines the clearance level 122 or the role of the user to view potentially sensitive or confidential information. At box 703, the document redaction application 116 can identify a role associated with the user. The role of the user can be identified by determining a user account through which the user is attempting to access content provided through the document redaction application 116 or a user account associated with a client device 106 through which the user is attempting to view content. The role can comprise a role within an organizational hierarchy within an enterprise and can be determined by consulting user data 117.

At step 705, the document redaction application 116 can determine a clearance level 122 associated with a role of the user. The clearance level 122 can specify what type of content the user is entitled to view unredacted or unmodified, which type of content should be redacted or modified, and a scaling level for the different content types. The scaling level can specify to what degree content should be modified or generalized by the document redaction application 116 before providing a document to the user.

At step 707, the document redaction application 116 can determine a redaction level associated with the clearance level 122. The redaction level can specify which content should be redacted or modified based upon the clearance level 122 and a scaling level specified by the clearance level 122.

At step 709, the document redaction application 116 can generate a modified version of the document or content based upon the redaction level identified at step 707. Various content can be modified or redacted according to the clearance level 122 specified for the user. In one instance, names appearing in a document can be modified by consulting a directory service, identity management service, or other system and querying using the name to generalize a name to initials, a job position or title, or an employer name. Accordingly, if the clearance level 122 or scaling level specifies that names should be generalized or redacted, the document redaction application 116 can modify or redact names appearing in the document.

In another instance, ID numbers appearing in a document can be modified by removing or randomizing a quantity of leading or significant digits. Accordingly, if the clearance level 122 or scaling level specifies that ID numbers should be generalized or redacted, the document redaction application 116 can modify or redact ID numbers appearing in the document. In another instance, dates appearing in a document can be modified by rounding to the nearest month, year, or decade. Accordingly, if the clearance level 122 or scaling level specifies that dates should be generalized or redacted, the document redaction application 116 can modify or redact dates appearing in the document.

In another instance, addresses appearing in a document can be modified by consulting a maps API to determine a city, state, or other geographical region in which an address is located. Accordingly, if the clearance level 122 or scaling level specifies that addresses should be generalized or redacted, the document redaction application 116 can modify or redact addresses appearing in the document based upon a generalized location obtained from the maps API. In another instance, device information appearing in a document can be modified by consulting a device management service or device database to identify generalized information about the device, such as whether the device is managed or unmanaged by the management service 115, an organizational group in which the device belongs, an operating system of the device, and other generalized device information. Accordingly, if the clearance level 122 or scaling level specifies that device information should be generalized or redacted, the document redaction application 116 can modify or redact device identifying information appearing in the document. In another instance, financial values appearing in a document can be modified by rounding the values to the nearest $100^{th}$, $1000^{th}$, and so on. Accordingly, if the clearance level 122 or scaling level specifies that financial values should be generalized or redacted, the document redaction application 116 can modify or redact financial values appearing in the document.

At step 711, the document redaction application 116 can transmit the modified document to a device associated with the user, which can be a client device 106 that is managed by the management service 115 or another device associated with the user. Thereafter, the process proceeds to completion.

Although the management service 115, the document redaction application 116, and other various systems described herein can be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows an example of the functionality and operation of an implementation of portions of the document redaction application 116. If embodied in software, each block may represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor 803 in a computer system or other system. The machine code can be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks can be scrambled relative to the order shown. Also, two or more successive blocks shown in FIG. 5 can be executed concurrently or with partial concurrence. Further, in some embodiments, one or more of the blocks shown in FIG. 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document redaction application 116, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM), dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the document redaction application 116, can be implemented and structured in a variety of ways. For example, one or more applications described can be implemented as modules or components of a single application. Further, one or more applications described herein can be executed in shared or separate computing devices or a combination thereof. For example, a plurality of the applications described herein may execute in the same computing device 800 and/or client device 106, or in multiple computing devices in the same computing environment 103. Additionally, it is understood that terms such as "application," "service," "system," "engine," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, causing the computing device to at least:

obtain a request to provide a document to a user associated with a user account, wherein the request is received from a user device of the user;

identify a role associated with the user account;

identify a clearance level associated with the role;

identify redactable content in the document, including identifying a content type associated with the redactable content;

determine one or more compliance conditions associated with the user device from which the request was received, the compliance conditions comprising at least one of a geographic location of the user device, a network type through which the user device accesses the document, or a configuration state of the user device;

determine a redaction level associated with the redactable content based upon the clearance level associated with the role and the one or more compliance conditions associated with the user device, wherein the redaction level includes a scaling level that specifies a degree to which the redactable content is to be generalized, wherein determining the redaction level comprises evaluating one or more compliance rules associated with the user device and the clearance level associated with the role to determine how the redactable content is to be modified for the user device;

select a generalization algorithm associated with the identified content type, the generalization algorithm defining a transformation for modifying the redactable content according to the scaling level;

generate a modified document based upon the redaction level, wherein generating the modified document includes generalizing a portion of the redactable content such that the portion of the redactable content is replaced in the modified document with a more generalized version of the redactable content, wherein the more generalized version of the redactable content is generated by applying the selected generalization algorithm to the redactable content based on the scaling level, wherein the generalization algorithm is controlled by the scaling level such that different scaling levels cause different degrees of generalization of the redactable content; and cause the modified document to be accessible to the user associated with the user account.

2. The non-transitory computer-readable medium of claim 1, wherein the content type comprises a proper noun, and a redaction rule generated based on the redaction level specifies redaction of the proper noun based upon the clearance level associated with the role.

3. The non-transitory computer-readable medium of claim 1, wherein the content type comprises an identification number, and a redaction rule generated based on the redaction level specifies redaction of the identification number based upon the clearance level associated with the role.

4. The non-transitory computer-readable medium of claim 1, wherein the content type comprises a financial value or a location, and a redaction rule generated based on the redaction level specifies generalization of the financial value or the location based upon the clearance level associated with the role.

5. The non-transitory computer-readable medium of claim 1, wherein the content type comprises device identifying information, and a redaction rule generated based on the redaction level specifies generalization of the device identifying information based upon the clearance level associated with the role.

6. The non-transitory computer-readable medium of claim 1, wherein the configuration state of the user device further comprises one or more of:

whether the user device has been modified to obtain root access or superuser privileges;

whether one or more unauthorized applications are installed on the user device;

whether one or more required applications specified by an administrator are installed on the user device; and whether the user device employs data-at-rest encryption for stored content.

7. A system, comprising:

at least one computing device;

at least one application executed by the at least one computing device, the at least one application, when executed, causing the at least one computing device to at least:

obtain a request to provide a document to a user associated with a user account, wherein the request is received from a user device of the user;

identify a role associated with the user account;

identify a clearance level associated with the role;

identify redactable content in the document, including identifying a content type associated with the redactable content;

determine one or more compliance conditions associated with the user device from which the request was received, the compliance conditions comprising at least one of a geographic location of the user device, a network type through which the user device accesses the document, or a configuration state of the user device;

determine a redaction level associated with the redactable content based upon the clearance level associated with the role and the one or more compliance conditions associated with the user device, wherein the redaction level includes a scaling level that specifies a degree to which the redactable content is to be generalized, wherein determining the redaction level comprises evaluating one or more compliance rules associated with the user device and the clearance level associated with the role to determine how the redactable content is to be modified for the user device;

select a generalization algorithm associated with the identified content type, the generalization algorithm defining a transformation for modifying the redactable content according to the scaling level;

generate a modified document based upon the redaction level, wherein generating the modified document includes generalizing a portion of the redactable content such that the portion of the redactable content is replaced in the modified document with a more generalized version of the redactable content, wherein the more generalized version of the redactable content is generated by applying the selected generalization algorithm to the redactable content based on the scaling level, wherein the generalization algorithm is controlled by the scaling level such that different scaling levels cause different degrees of generalization of the redactable content; and cause the modified document to be accessible to the user associated with the user account.

8. The system of claim 7, wherein the content type comprises a proper noun, and a redaction rule generated based on the redaction level specifies redaction of the proper noun based upon the clearance level associated with the role.

9. The system of claim 7, wherein the content type comprises an identification number, and a redaction rule generated based on the redaction level specifies redaction of the identification number based upon the clearance level associated with the role.

10. The system of claim 7, wherein the content type comprises a financial value or a location, and a redaction rule generated based on the redaction level specifies generalization of the financial value or the location based upon the clearance level associated with the role.

11. The system of claim 7, wherein the content type comprises device identifying information, and a redaction rule generated based on the redaction level specifies generalization of the device identifying information based upon the clearance level associated with the role.

12. The system of claim 7, wherein the configuration state of the user device comprises one or more of:

whether the user device has been modified to obtain root access or superuser privileges;

whether one or more unauthorized applications are installed on the user device;

whether one or more required applications specified by an administrator are installed on the user device; and whether the user device employs data-at-rest encryption for stored content.

13. A method, comprising:

obtaining, by at least one computing device, a request to provide a document to a user associated with a user account, wherein the request is received from a user device of the user;

identifying, by the at least one computing device, a role associated with the user account; identifying, by the at least one computing device, a clearance level associated with the role;

identifying, by the at least one computing device, redactable content in the document, including identifying a content type associated with the redactable content;

determining, by the at least one computing device, one or more compliance conditions associated with the user device from which the request was received, the compliance conditions comprising at least one of a geographic location of the user device, a network type through which the user device accesses the document, or a configuration state of the user device;

determining, by the at least one computing device, a redaction level associated with the redactable content based upon the clearance level associated with the role and the one or more compliance conditions associated with the user device, wherein the redaction level includes a scaling level that specifies a degree to which the redactable content is to be generalized, wherein determining the redaction level comprises evaluating one or more compliance rules associated with the user device and the clearance level associated with the role to determine how the redactable content is to be modified for the user device;

selecting a generalization algorithm associated with the identified content type, the generalization algorithm defining a transformation for modifying the redactable content according to the scaling level;

generating, by the at least one computing device, a modified document based upon the redaction level, wherein generating the modified document includes generalizing a portion of the redactable content such that the portion of the redactable content is replaced in the modified document with a more generalized version of the redactable content, wherein the more generalized version of the redactable content is generated by applying the selected generalization algorithm to the redactable content based on the scaling level, wherein the generalization algorithm is controlled by the scaling level such that different scaling levels cause different degrees of generalization of the redactable content; and causing, by the at least one computing device, the modified document to be accessible to the user associated with the user account.

14. The method of claim 13, wherein the content type comprises a proper noun, and a redaction rule generated based on the redaction level specifies redaction of the proper noun based upon the clearance level associated with the role.

15. The method of claim 13, wherein the content type comprises an identification number, and a redaction rule generated based on the redaction level specifies redaction of the identification number based upon the clearance level associated with the role.

16. The method of claim 13, wherein the content type comprises a financial value or a location, and a redaction rule generated based on the redaction level specifies generalization of the financial value or the location based upon the clearance level associated with the role.

17. The method of claim 13, wherein the configuration state of the user device comprises one or more of:

whether the user device has been modified to obtain root access or superuser privileges;

whether one or more unauthorized applications are installed on the user device;

whether one or more required applications specified by an administrator are installed on the user device; and whether the user device employs data-at-rest encryption for stored content.

* * * * *